(12) United States Patent
Kondo et al.

(10) Patent No.: US 7,473,208 B2
(45) Date of Patent: Jan. 6, 2009

(54) SHIFT CONTROL DEVICE OF AUTOMATIC TRANSMISSION

(75) Inventors: Masami Kondo, Toyota (JP); Tooru Matsubara, Susono (JP); Yoshikazu Tanaka, Toyota (JP); Yasushi Sato, Anjo (JP); Satoshi Yoshida, Anjo (JP); Akira Fukatsu, Anjo (JP); Kiyoshi Watanabe, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 192 days.

(21) Appl. No.: 10/565,103
(22) PCT Filed: Jul. 9, 2004
(86) PCT No.: PCT/JP2004/010169

§ 371 (c)(1),
(2), (4) Date: Jan. 19, 2006

(87) PCT Pub. No.: WO2005/010407

PCT Pub. Date: Feb. 3, 2005

(65) Prior Publication Data

US 2006/0190154 A1    Aug. 24, 2006

(30) Foreign Application Priority Data

Jul. 28, 2003 (JP) .............................. 2003-202710

(51) Int. Cl.
*B60W 10/06* (2006.01)
*B60W 10/10* (2006.01)

(52) U.S. Cl. ...................................... 477/116; 477/107
(58) Field of Classification Search .................. 477/116, 477/902
See application file for complete search history.

(56) References Cited

U.S. PATENT DOCUMENTS

| 5,107,723 | A | 4/1992 | Yamashita et al. |
| 5,743,826 | A | 4/1998 | Usuki et al. |
| 5,938,563 | A | 8/1999 | Nishio et al. |
| 2002/0187877 | A1 | 12/2002 | Skupinski et al. |
| 2003/0036457 | A1* | 2/2003 | Wu et al. ...................... 477/98 |

FOREIGN PATENT DOCUMENTS

| JP | 02-038750 | 2/1990 |
| JP | 02-190660 A | 7/1990 |

* cited by examiner

*Primary Examiner*—Sherry L Estremsky
*Assistant Examiner*—Edwin A Young
(74) *Attorney, Agent, or Firm*—Kenyon & Kenyon LLP

(57) ABSTRACT

A shift control device of an automatic transmission comprising detection means for detecting a shift from a non-drive to a drive position; output means for outputting a command to execute an engine output lowering; detection means for detecting a transmission input revolution number and control means for engaging the friction engagement element by direct pressure control in response to a detection of said transmission input revolution number having been decreased to a predetermined value.

20 Claims, 6 Drawing Sheets

F I G. 2

|  |  | C1 | C2 | C3 | C4 | B1 | B2 | B3 | B4 | F0 | F1 | F2 | F3 |
|---|---|---|---|---|---|---|---|---|---|---|---|---|---|
|  | P |  |  |  |  |  |  |  |  |  |  |  |  |
|  | R |  |  | ○ |  | ◎ |  | ○ |  | ○ |  |  |  |
|  | N |  |  |  |  |  |  |  |  |  |  |  |  |
| D | 1st | ○ |  |  | ◎ |  |  |  | ◎ | ○ |  |  | ○ |
|  | 2nd | ○ |  |  | ◎ |  | ◎ | ○ |  | ○ | ○ | ○ |  |
|  | 3rd | ○ |  | ○ | ◎ | ◎ |  | △ |  | ○ | ○ |  |  |
|  | 4th | ○ | ○ | △ | ◎ |  |  | △ |  | ○ |  |  |  |
|  | 5th | △ | ○ | ○ |  | ○ |  | △ |  |  |  |  |  |
|  | 6th | △ | ○ |  |  | △ | ○ | △ |  |  |  |  |  |

○ ENGAGED
◎ ENGAGED WHEN ENGINE BRAKE IS APPLIED
△ ENGAGED BUT IRRELEVANT TO POWER TRANSMISSION

|  | S1 | S2 | S3 | S4 | SR |
|---|---|---|---|---|---|
| N→D<br>C1 DIRECT PRESSURE<br>B2 DIRECT PRESSURE | × | ○ | ○ | ○ | × |
| N→D<br>C1 LINE PRESSURE<br>B2 DIRECT PRESSURE | × | ○ | ○ | ○ | ○ |
| D (1st)<br>C1 LINE PRESSURE<br>B2 DRAIN | × | ○ | ○ | × | ○ |

SHIFT CONTROL DEVICE OF AUTOMATIC TRANSMISSION

RELATED APPLICATIONS

This is a 371 application of PCT/JP2004/010169 filed on 9 Jul. 2004, claiming priority to Japanese Application No. 2003-202710 filed on 28 Jul. 2003, the entire contents of which are incorporated herein by reference.

TECHNICAL FIELD

The present invention relates to a control technique of an automatic transmission, and more particularly to a control technique to prevent a shock when an automatic transmission is shifted from a neutral position to a forward drive position at the time of garage shift or the like.

BACKGROUND ART

Automatic transmissions mounted to vehicles are roughly divided into two types, geared and gearless. The geared automatic transmission is formed of a fluid coupling such as a torque converter and a gear transmission mechanism.

The geared automatic transmission is connected to an engine via the fluid coupling such as a torque converter. The geared automatic transmission is formed of a transmission mechanism (planetary gear deceleration mechanism) having a plurality of power transmission paths, and is configured to automatically switch the power transmission paths in accordance with accelerator opening and vehicle speed, for example, or to automatically switch the gear ratios (forward driving position). In the geared automatic transmission, clutch, brake and one-way clutch elements as friction elements are engaged or disengaged (released) as prescribed, to determine the gear levels.

A vehicle having such an automatic transmission is usually provided with a shift lever operated by a driver. Operating the shift lever can set a shift position (e.g., reverse drive position, neutral position, or forward drive position).

When the vehicle having the automatic transmission configured as described above is let out of a garage before driving or put into a garage after driving, a so-called garage shift is effected, from the parking (P) position to the reverse drive (R) position for moving backward, or from the neutral (N) position to the forward drive (D) position or the reverse drive (R) position to start driving.

The garage shift includes the case where the state of the automatic transmission is changed from a non-drive position (neutral (N) position) to a drive position (forward drive (D) position). Techniques to solve various problems arising in such a case have conventionally been disclosed.

For example, Japanese Patent Laying-Open No. 2-190660 discloses a shift control device for an automatic transmission that compensates for oil pressure necessary to surely fasten a friction engagement element at the time of stall start, while preventing an excessive shock at the time of racing select start, upon shift from the neutral (N) position to the forward drive (D) position with an engine rotating at high speed. The shift control device of the automatic transmission includes range transfer detecting means for detecting a select from a power cutoff range to a forward or reverse drive range, rotating speed detecting means for detecting the rotating speed of the engine at the power cutoff range, rotating state determining means for determining, when the range transfer detecting means detects a select signal from the power cutoff range to the forward or reverse drive range, whether the engine rotating speed detected by the rotating speed detecting means is a preset value or above indicating the racing select start, and liquid pressure lowering means for lowering the fastening pressure of the friction element than a value set in a normal control when the rotating state determining means determines that the engine rotating speed is the preset value or above.

With this control shift device of the automatic transmission, when the select to the drive range is detected by the range transfer detecting means, the fastening pressure is decreased by the liquid pressure lowering means only if the engine rotating speed at the power cutoff range detected by the rotating speed detecting means is a preset value or above. Thus, it is possible to mitigate the excessive fastening shock by lowering the fastening pressure at the time of racing select start when the engine rotating speed is increased in the power cutoff range for start. On the other hand, at the time of normal stall start when the engine rotating speed is increased after the range is switched to the running range, the engine rotating speed detected by the rotating speed detecting means is low, with which the liquid pressure lowering means is not operated. As such, the ordinary high fastening pressure is secured, thereby ensuring fastening of the friction engagement element.

With the shift control device of an automatic transmission disclosed in Japanese Patent Laying-Open No. 2-190660, however, only the fastening pressure of the friction element is decreased from a value set in the normal control when the rotating state determining means determines that the engine rotating speed is a preset value or above. As such, the friction engagement element is engaged while the engine rotating speed is high, although the engagement pressure is lowered with the liquid pressure lowering means.

That is, the friction engagement member should be engaged while the input revolution number to the automatic transmission is high, which requires enhancement in strength, heat resistance and the like of the friction engagement element. As a result, the friction engagement element suffers the following problems:

1) cost increase (increase in number of the friction member sets, increase in thickness of the separator plates);

2) weight increase (increase in number of the friction member sets, change in quality of the friction members, increase in thickness of the separator plates); and 3) occurrence of shift shock (increase of torque gain with respect to oil pressure due to increase in number of the friction member sets, increase of peak torque due to increase of engagement oil pressure and reduction of gear change time).

DISCLOSURE OF THE INVENTION

An object of the present invention is to provide a shift control device of an automatic transmission that can suppress a shift shock when the state of the automatic transmission is changed from a non-drive state to a drive state. Another object of the present invention is to provide a shift control device of an automatic transmission that can improve durability of a friction engagement element when the state of the automatic transmission is changed from the non-drive state to the drive state.

The shift control device of an automatic transmission according to an aspect of the present invention controls an automatic transmission that shifts an output from an engine to transmit power. The automatic transmission includes a friction engagement element that is engaged in a drive position and released in a non-drive position. The engagement pressure of the friction engagement element is controllable by direct pressure. The shift control device includes a detection unit that detects a shift from the non-drive position to the drive position, an output unit that outputs a command to execute an output lowering process of the engine to an engine control device in response to detection of the shift to the drive position, a detection unit that detects an input revolution number to the automatic transmission, and a control circuit that starts engagement of the friction engagement element by direct pressure control when it is detected that the input revolution number is lowered to a predetermined revolution number by the output lowering process.

When there is a shift from a neutral (N) position as the non-drive position to a forward drive (D) position as the drive position, the friction engagement element called an input clutch is changed from a disengaged state to an engaged state. At this time, the output of the engine is lowered before the input clutch is engaged. As the number of revolutions of the engine decreases, when it is detected that the input revolution number to the automatic transmission (number of revolutions of the turbine when a torque converter is connected to an output shaft of the engine) is lowered to a level ensuring heat resistance of the input clutch, then engagement of the friction engagement element is started by the direct pressure control. As such, the direct pressure control is used to delay the start of engagement of the input clutch until the engine revolution number is decreased. If the input clutch is put into an engaged state abruptly while the input revolution number to the automatic transmission is still high, the input clutch may be broken or degraded, or a shift shock may occur due to high engine torque. Even if the input clutch is put into the engaged state gradually while the input revolution number to the automatic transmission is high, the input clutch generates heat, resulting in degradation thereof. In contrast, according to the present invention, the direct pressure control is used to delay the start of engagement of the input clutch until the engine revolution number is decreased, so that the problems of degradation of the input clutch and occurrence of the shift shock are eliminated. As a result, it is possible to provide a shift control device of an automatic transmission that can suppress a shift shock and improve durability of a friction engagement element when the state of the automatic transmission is changed from a non-drive state to a drive state.

The shift control device of an automatic transmission according to another aspect of the present invention includes a detection unit that detects a shift from the non-drive position to the drive position, an output unit that outputs a command to execute an output lowering process of the engine to an engine control device in response to detection of the shift to the drive position, and a control circuit that starts engagement of the friction engagement element by direct pressure control after a lapse of a predetermined period of time following initiation of the output lowering process.

The output of the engine is lowered before the input clutch is engaged. After a lapse of the predetermined period of time, when the engine revolution number is decreased and the input revolution number to the automatic transmission is decreased to a level ensuring heat resistance of the input clutch, then the engagement of the friction engagement element is started by the direct pressure control. As such, the direct pressure control is used to delay the start of engagement of the input clutch until the engine revolution number is lowered. When the input clutch is engaged while the input revolution number to the automatic transmission is still high, whether it is engaged abruptly or gradually, the input clutch would be degraded or a shift shock would occur. In contrast, according to the present invention, the direct pressure control is used to delay the start of engagement of the input clutch until the engine revolution number is decreased, and thus, the problems of degradation of the input clutch and occurrence of the shift shock are prevented. As a result, it is possible to provide a shift control device of an automatic transmission that can suppress a shift shock and improve durability of a friction engagement element when the state of the automatic transmission is changed from the non-drive state to the drive state.

Preferably, the shift control device of the automatic transmission may further include a circuit controlling the engagement pressure using the direct pressure control to prevent the friction engagement element from transmitting power in response to detection of the shift to the drive position.

The engagement pressure is controlled using the direct pressure control such that the input clutch does not transmit power even if the state is changed to the drive position. As such, the input clutch does not enter the engaged state in which it would transmit power. The engagement while the input revolution number to the automatic transmission is high is prevented. Accordingly, occurrence of the problems due to heat generation and the like is avoided.

Still preferably, the predetermined revolution number is set based on a heat absorption amount of the friction engagement element at the time of engagement.

It is possible to set the revolution number such that the heat absorption amount of the friction engagement element at the time of engagement does not exceed the heat absorption capacity determined by properties of the friction member or the like.

Still preferably, the predetermined period of time is set based on a time when the revolution number to the automatic transmission attains a value that is set in accordance with the heat absorption amount of the friction engagement element at the time of engagement.

It is possible to set the time ensuring that the revolution number becomes the value with which the heat absorption amount of the friction engagement element at the time of engagement does not exceed the heat absorption capacity determined based on the properties of the friction member or the like.

Still preferably, the drive position corresponds to a forward drive position, the non-drive position corresponds to a neutral position, and the friction engagement element is an input clutch.

At the time of shift from the neutral (N) position to the forward drive (D) position, the input clutch is engaged by direct pressure control after the input revolution number to the automatic transmission is lowered to the level not affecting heat resistance of the input clutch. Accordingly, it is possible to provide a shift control device of an automatic transmission that can suppress a shift shock and also improve durability of the input clutch.

BRIEF DESCRIPTION OF THE DRAWINGS

FIG. 2 is an operation table of the automatic transmission shown in FIG. 1.

BEST MODES FOR CARRYING OUT THE INVENTION

Figure 1:
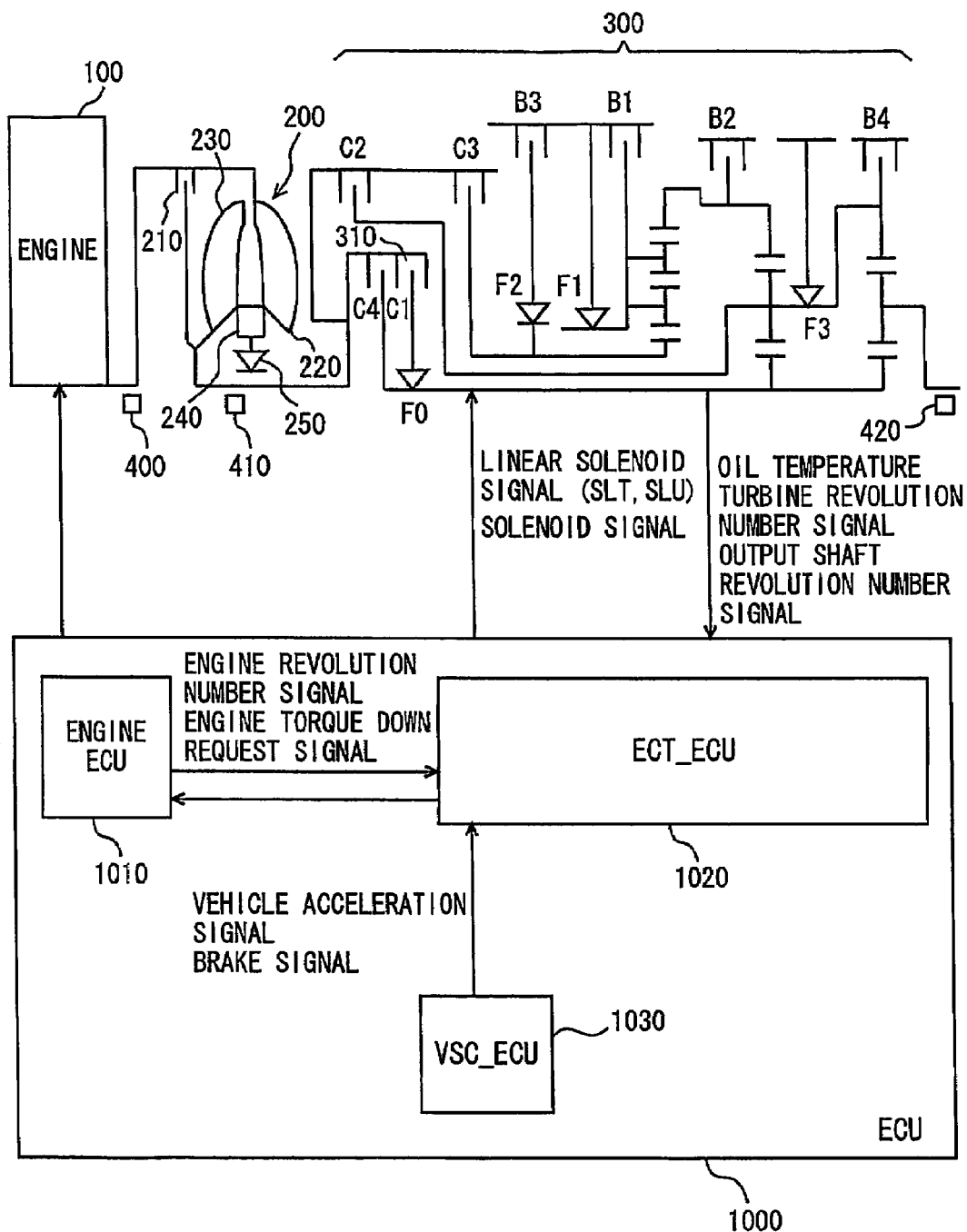
FIG. 1 is a control block diagram of an automatic transmission according to an embodiment of the present invention.

Hereinafter, embodiments of the present invention will be described with reference to the drawings. In the following description, the same portions are denoted by the same reference characters, and they are identical in name and function as well. Thus, detailed description thereof will not be repeated where appropriate.

A power train of a vehicle including the control device according to an embodiment of the present invention is now described. The control device of the present embodiment is implemented by an ECU (Electronic Control Unit) 1000 shown in FIG. 1. The automatic transmission is formed of a torque converter 200 in the form of a fluid coupling and an automatic transmission mechanism 300 in the form of a planetary gear transmission mechanism.

Referring to FIG. 1, the power train of a vehicle including the control device of the present embodiment is described. More specifically, the control device of the present embodiment is implemented by an ECT (Electronic Controlled Automatic Transmission)_ECU 1020 within ECU 1000 shown in FIG. 1.

As shown in FIG. 1, the power train of the vehicle is formed of an engine 100, torque converter 200, automatic transmission mechanism 300, and ECU 1000.

Engine 100 has an output shaft connected to an input shaft of torque converter 200. Engine 100 and torque converter 200 are connected via a rotating shaft. Thus, the number of revolutions NE of the output shaft of engine 100 (or engine revolution number NE) detected by an engine revolution number sensor 400 is equal to the number of revolutions of the input shaft of torque converter 200 (or pump revolution number).

Torque converter 200 is formed of a lockup clutch 210 making the input and output shafts directly coupled, a pump impeller 220 on the input shaft side, a turbine impeller 230 on the output shaft side, and a stator 240 having a one-way clutch 250 and performing a torque amplifying function. Torque converter 200 and automatic transmission mechanism 300 are connected via a rotating shaft. The number of revolutions NT of the output shaft of torque converter 200 (or turbine revolution number NT) is detected by a turbine revolution number sensor 410. The number of revolutions NOUT of the output shaft of automatic transmission mechanism 300 is detected by an output shaft revolution number sensor 420.

Lockup clutch 210 is operated as a lockup relay valve applying oil pressure switches the apply/drain of the oil pressure between the engage side and the release side. As a lockup piston moves in the axial direction, the lockup piston is connected to or disconnected from a front cover via a friction member. Lockup clutch 210 partitions the interior of the torque converter. A release side oil chamber for release of lockup clutch 210 is formed between the lockup piston and the front cover, while an engage side oil chamber for engagement of lockup clutch 210 is formed between the lockup piston and a turbine runner. The hydraulic circuit within the valve body applies the oil pressure to the release side oil chamber and the engage side oil chamber.

FIG. 2 shows an operation table of automatic transmission mechanism 300. The operation table of FIG. 2 shows engagement and disengagement of friction elements of clutch elements (C1-C4 in the figure), brake elements (B1-B4) and one-way clutch elements (F0-F3) in respective gear levels. At the time of the first gear level used for start of a vehicle, clutch element (C1) and one-way clutch elements (F0, F3) are engaged. Of these clutch elements, clutch element C1 is specifically called an input clutch (C1) 310. Input clutch (C1) 310 is also called an ahead clutch or a forward clutch, and is always used in the engaged state for any gear level making a vehicle move forward, other than the parking (P) position, the reverse drive (R) position and the neutral (N) position. Thus, when there is a shift from the forward drive (D) position to the neutral (N) position, this input clutch (C1) 310 is also changed from the engaged state to the disengaged state. The hydraulic circuit associated with input clutch (C1) 310 will be described later in detail.

ECU 1000 controlling these power trains includes an engine ECU 1010 controlling engine 100, an ECT (Electronic Controlled Automatic Transmission)_ECU 1020 controlling automatic transmission mechanism 300, and a VSC (Vehicle Stability Control)_ECU 1030.

ECT_ECU 1020 receives a signal indicating the number of revolutions of turbine NT from turbine revolution number sensor 410, and a signal indicating the number of revolutions of output shaft NOUT from output shaft revolution number sensor 420. ECT_ECU 1020 also receives from engine ECU 1010 a signal indicating the number of revolutions of engine NE detected by engine revolution number sensor 400 and a signal indicating throttle opening detected by a throttle position sensor.

These revolution number sensors are arranged opposite to the teeth of the revolution detecting gears attached to the input shaft of torque converter 200, the output shaft of torque converter 200 and the output shaft of automatic transmission mechanism 300. They are capable of detecting any subtle rotation of the input shaft of torque converter 200, the output shaft of torque converter 200 and the output shaft of automatic transmission mechanism 300. For example, a sensor using a magneto-resistive element, generally called a semiconductor sensor, may be employed therefor.

ECT_ECU 1020 further receives from VSC_ECU 1030 a signal indicating vehicle acceleration detected by a G sensor, and a signal indicating that the brake is on. VSC_ECU 1030 receives a brake control signal from ECT_ECU 1020, and controls the brake of the vehicle. An accelerator opening signal is transmitted from VSC_ECU 1030 to ECT_ECU 1020. An engine torque down request signal is transmitted from ECT_ECU 1020 to engine ECU 1010. Specifically, a fuel cut request signal, a throttle opening limit request signal and others are transmitted as the engine torque down request signals.

ECT_ECU 1020 outputs control signals to linear solenoid valves (SLT, SLU), on/off solenoid valves and others of the hydraulic circuit of automatic transmission mechanism 300. These control signals cause engagement/disengagement of desired friction engagement elements as shown in FIG. 2 and also cause switch between the apply and drain paths of the operating oil.

In ECU 1000 as the control device according to the embodiment of the present invention, in response to the state of automatic transmission mechanism 300 changed from a non-drive position (neutral N) position) to a drive position (forward drive (D) position), ECT_ECU 1020 requests engine torque down to engine ECU 1010 to decrease the engine revolution number NE of engine 100. When the turbine revolution number NT of torque converter 300 is decreased to a predetermined revolution number (the revolution number with which no problem occurs associated with heat resistance of input clutch (C1) 310), input clutch (C1) 310 is engaged by direct pressure control. That is, the direct pressure control is employed to delay the engagement start timing of input clutch (C1) 310.

Figure 3:
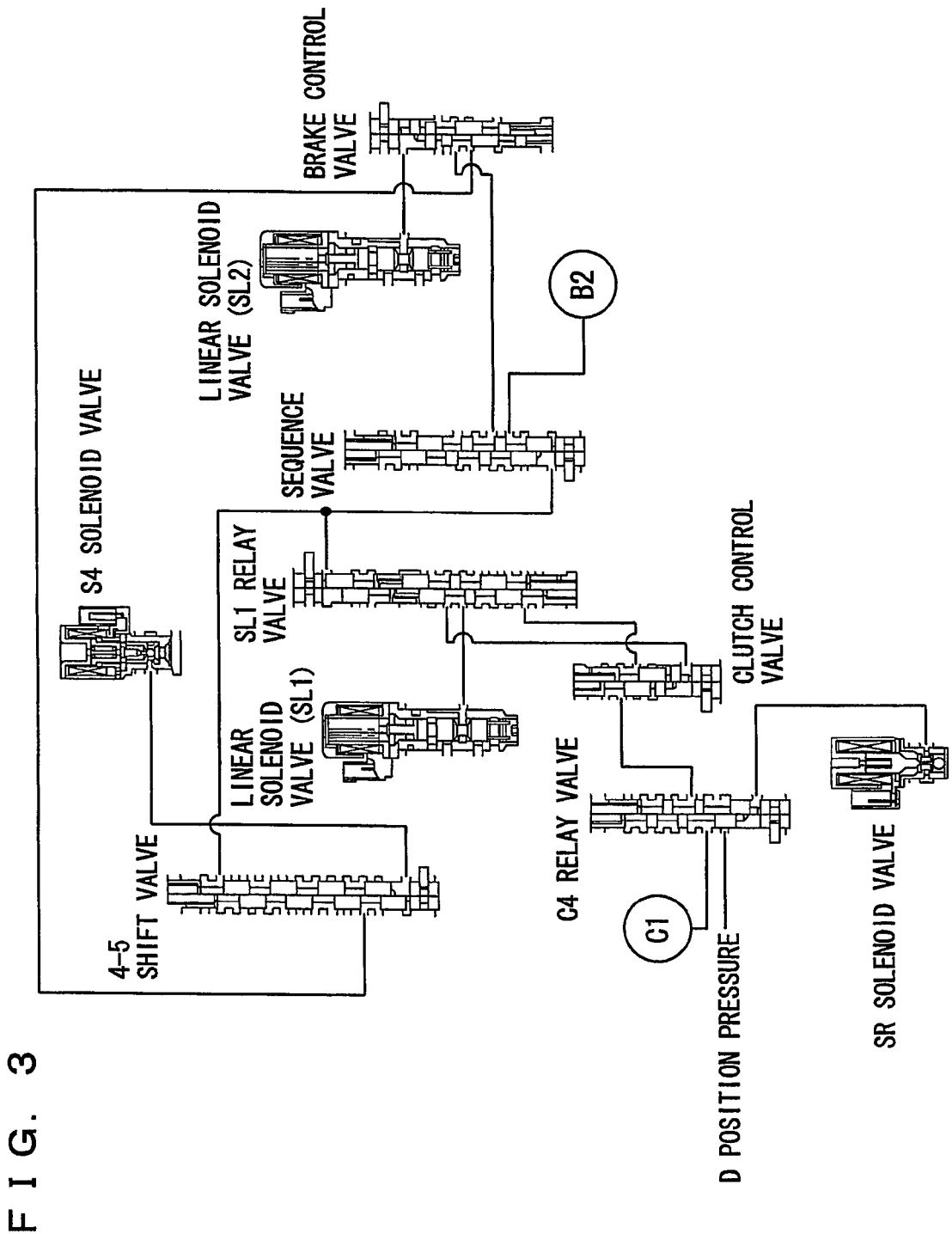
FIG. 3 shows a hydraulic circuit.

The hydraulic circuit associated with input clutch (C1) 310 controlled by the control device of the present embodiment is now described with reference to FIG. 3. FIG. 3 shows a portion of the hydraulic circuit.

The most significant feature of this hydraulic circuit is that a linear solenoid valve (SL1) enables direct pressure control of input clutch (C1) 310. Input clutch (C1) 310 is connected to a C4 relay valve that is controlled by an SR solenoid valve. The C4 relay valve is connected to linear solenoid valve (SL1) via a clutch control valve and an SL1 relay valve. The SL1 relay valve is supplied with operating oil via a 4-5 shift valve that is controlled by an S4 solenoid valve. The hydraulic circuit is formed to allow direct pressure control of the brake element B2 as well.

Figures 4A, 4B:
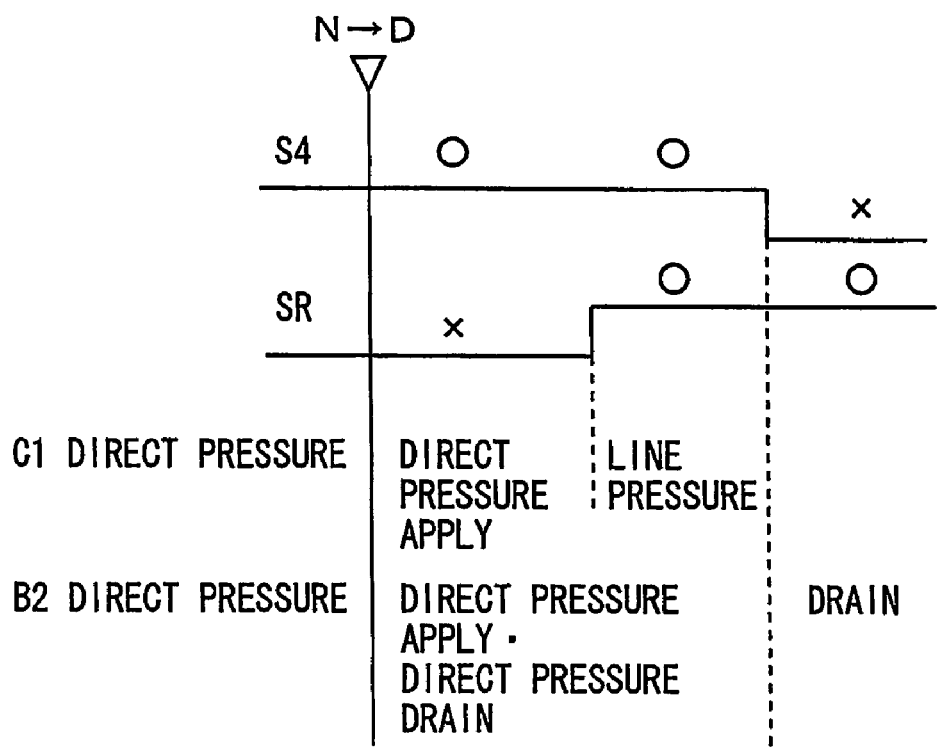
FIGS. 4A and 4B are operation table and timing chart, respectively, of the hydraulic circuit shown in FIG. 3.

FIG. 4A shows an operation table of the associated solenoid valves, and FIG. 4B shows a timing chart of operations according to the operation table. At the time of shift from the neutral (N) position to the forward drive (D) position, direct pressure control and line pressure control of input clutch (C1) 310 are switched via on/off of the SR solenoid valve. The direct pressure control is effected when the SR solenoid valve is off (x), while the line pressure control is effected when it is on (O). In either case, the S1 solenoid valve is off (x), and the S2, S3 and S4 solenoid valves are on (O). It is noted that the line pressure control refers to the state of control in the case where the line pressure is applied to the friction engagement elements rather than the oil pressure adjusted by a linear solenoid valve using direct pressure control. Hereinafter, the line pressure control is also referred to as line pressure apply.

The direct pressure control makes it possible to control the engagement start timing and the engagement pressure of input clutch (C1) 310 by command signal values output from ECT_ECU 1020 to linear solenoid valve (SL1).

It is noted that, in the first gear level of the forward drive (D) position, input clutch (C1) 310 undergoes line pressure control, with the S1 solenoid valve being off (x), the S2 and S3 solenoid valves on (O), the S4 solenoid valve off (x), and the SR solenoid valve on (O).

Further, the direct pressure apply and the direct pressure drain with respect to brake element B2 are designated by control command values to a linear solenoid valve (SL2).

Figure 5:
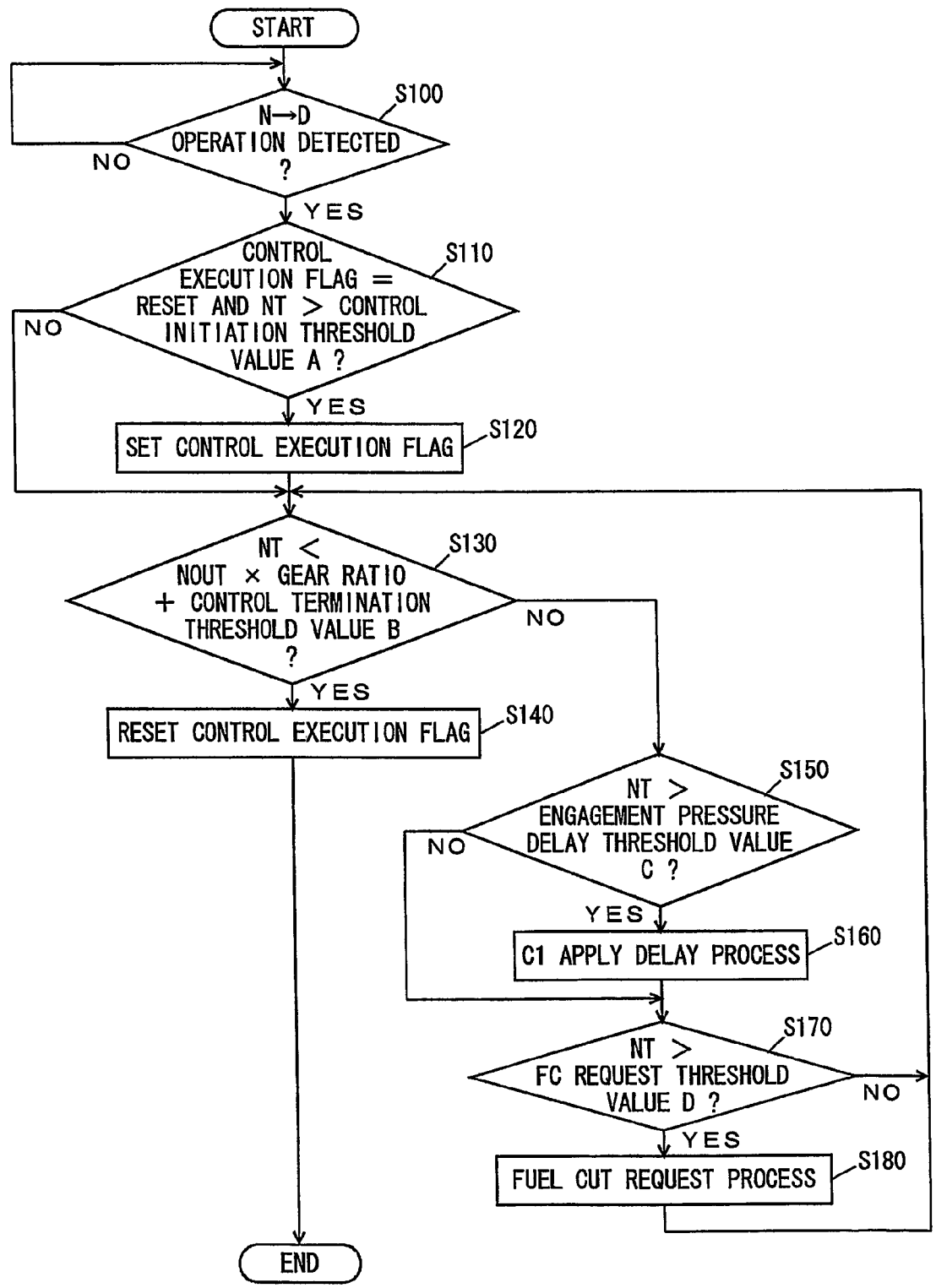
FIG. 5 is a flowchart illustrating a control structure of a program that is executed by an ECU according to the embodiment of the present invention.

A control structure of the program performed by ECT_ECU 1020 as the control device of the present embodiment is now described with reference to FIG. 5.

In step (hereinafter "S") 100, ECT_ECU 1020 determines whether a shift operation from the neutral (N) position to the forward drive (D) position has been done. Specifically, ECT_ECU 1020 makes the determination based on the states of N and D contact points of a neutral start switch (NSW) provided on the lateral side of automatic transmission mechanism 300. When the shift operation from the neutral (N) position to the forward drive (D) position is detected (YES in S100), the process goes to S110. If not (NO in S100), the process returns to S100, where a shift operation from the neutral (N) position to the forward drive (D) position is awaited.

In S110, ECT_ECU 1020 determines whether a control execution flag is reset and the turbine revolution number NT is greater than a control initiation threshold value A. When the control execution flag is in the reset state and the turbine revolution number NT is greater than the control initiation threshold value A (YES in S110), the process goes to S120. If not (NO in S110), the process goes to S130.

In S120, ECT_ECU 1020 sets the control execution flag. In S130, ECT_ECU 1020 determines whether the turbine revolution number NT is smaller than a value of the output shaft revolution number NOUT of automatic transmission mechanism 300 multiplied by a gear ratio and added with a control termination threshold value B. When NT<NOUT×gear ratio+ control termination threshold value B (YES in S130), the process goes to S140. If not (NO in S130), the process goes to S150.

In S140, ECT_ECU 1020 resets the control execution flag to terminate the process.

In S150, ECT_ECU 1020 determines whether the turbine revolution number NT is greater than an engagement pressure delay threshold value C. When the turbine revolution number NT is greater than the engagement pressure delay threshold value C (YES in S150), the process goes to S160. If not (NO in S150), the process goes to S170.

In S160, ECT_ECU 1020 performs the apply delay process of the operating oil to input clutch (C1) 310. Specifically, ECT_ECU 1020 delays the output of the control command signal to the linear solenoid valve (SL1), to delay the start of engagement of input clutch (C1) 310.

In S170, ECT_ECU 1020 determines whether the turbine revolution number NT is greater than a fuel cut request threshold value D. When the turbine revolution number NT is greater than the fuel cut request threshold value D (YES in S170), the process goes to S180. If not (NO in S170), the process returns to S130.

In S180, ECT_ECU 1020 performs the fuel cut request process. At this time, ECT_ECU 1020 transmits a fuel cut request signal as the engine torque down request signal to engine ECU 1010. After completion of the process of S180, the process returns to S130.

The relation in size of the threshold values explained in conjunction with the flowchart is as follows: threshold value B<threshold value A<threshold value D<threshold value C, although the present invention is not limited thereto.

Hereinafter, an operation according to the structure and flowchart as described above when a shift operation from the neutral (N) position to the forward drive (D) position is performed in a vehicle mounted with ECT_ECU 1020 as the control device according to the present embodiment is described.

When a driver operates the shift lever to perform the shift operation from the neutral (N) position to the forward drive (D) position (YES in S100), if the control execution flag is in a reset state and the turbine revolution number NT is greater than the control initiation threshold value A (YES in S110), the control execution flag is set (S120). The control execution flag thus set indicates, when the state of this control execution flag is detected in a flowchart other than the flowchart shown in FIG. 5, that the engagement delay process of N→D input clutch (C1) 310 is in progress.

When the turbine revolution number NT is not smaller than (NOUT×gear ratio+control threshold value B) (NO in S130) and is greater than the engagement pressure delay threshold value C (YES in S150), then the process of delaying application of the operating oil to input clutch (C1) 310 is performed (S160).

Figure 6:
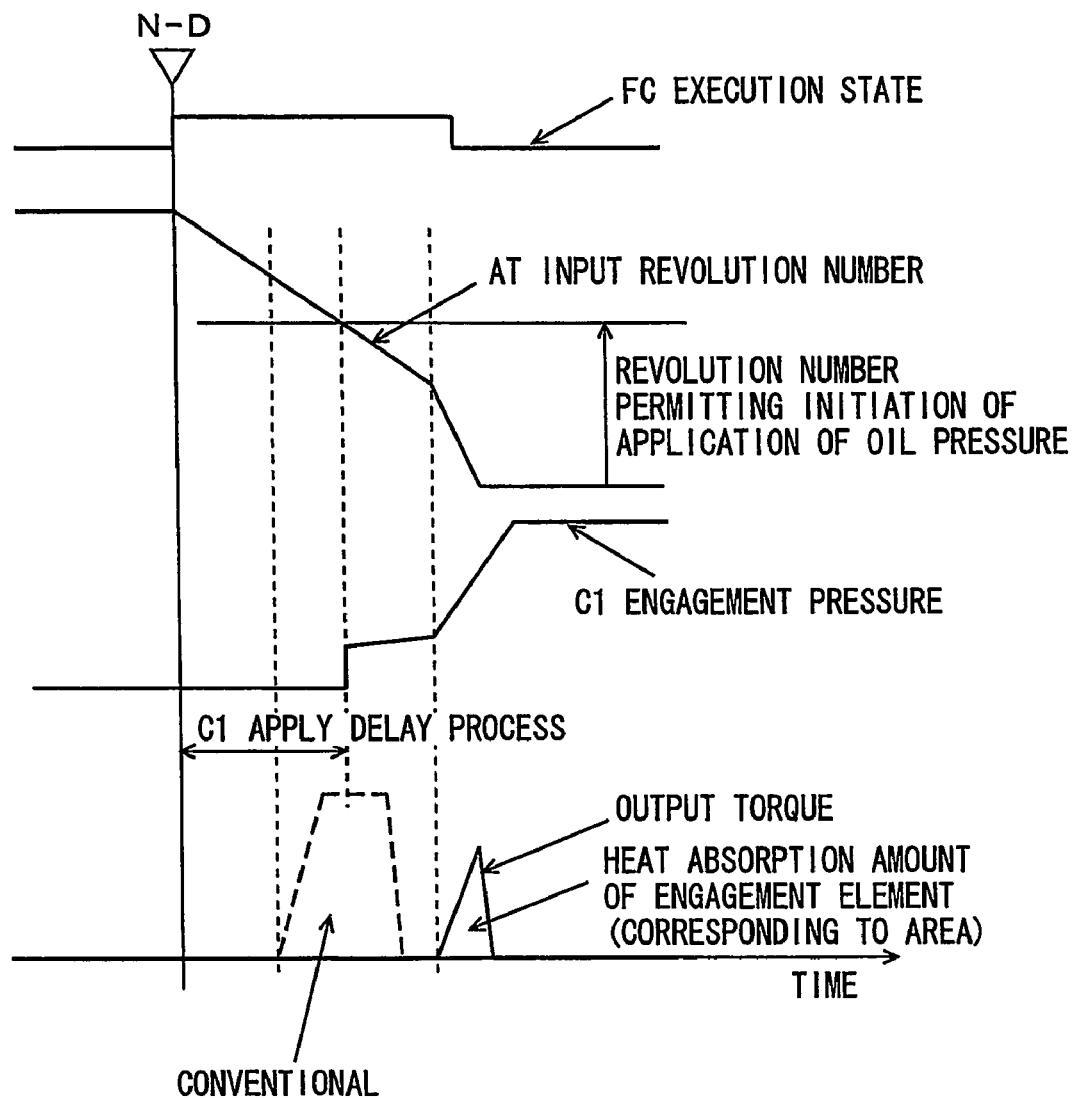
FIG. 6 is a timing chart illustrating an operation of a vehicle mounted with the automatic transmission according to the embodiment of the present invention.

At this time, as shown in the timing chart of FIG. 6, even if N→D is detected, the engagement oil pressure of input clutch (C1) 310 enters the C1 apply delay process state. This corresponds to the portion in FIG. 6 where the oil pressure does not increase to the level at which input clutch (C1) 310 is engaged.

When the turbine revolution number NT is greater than the fuel cut request threshold value D (YES in S170), the fuel cut request signal is transmitted to engine ECU 1010 (S180), and the fuel cut is performed at engine 100.

With the fuel cut executed at engine 100, the engine revolution number NE of engine 100 decreases, the input revolution number of torque converter 200 decreases, and the turbine revolution number NT, corresponding to the output shaft revolution number of torque converter 200 and to the input shaft revolution number of automatic transmission mechanism 300, also decreases.

Determination of the relation in size of the turbine revolution number to the engagement pressure delay threshold value C and the fuel cut request threshold value D is repeated until the turbine revolution number NT becomes smaller than (NOUT×gear ratio+control termination threshold value B) (NO in S130).

The threshold value C is greater (higher) than the threshold value D. Thus, as the turbine revolution number NT decreases, it becomes smaller than the engagement pressure delay threshold value C first and then becomes smaller than the fuel cut request threshold value D. When the turbine revolution number NT becomes the engagement pressure delay threshold value C or smaller (NO in S150), the apply delay process of the operating oil to input clutch (C1) 310 is terminated. As the C1 apply delay process is terminated, as shown in FIG. 6, the engagement pressure of input clutch (C1) 310 increases stepwise at first, and then increases gradually to finally allow application of the oil pressure sufficient for making input clutch (C1) 310 engaged.

When the turbine revolution number NT becomes the fuel cut request threshold value D or smaller (NO in S170), the fuel cut request process is no longer performed, and the fuel cut is stopped. A this time, the FC execution state changes from on to off as shown in FIG. 6.

In the C1 apply delay process, as shown in FIG. 6, the C1 engagement oil pressure does not increase at all, with no control command signal being output to the linear solenoid (SL1) until the turbine revolution number NT attains a predetermined value. When the AT input revolution number (turbine revolution number NT) becomes smaller than the predetermined, engagement pressure delay threshold value C, the C1 engagement oil pressure increases stepwise. These are controlled by the control command value output from ECT_ECU 1020 to the linear solenoid (SL1).

The C1 apply delay process delays the engagement of input clutch (C1) 310, based on the changed state of the input revolution number of automatic transmission mechanism 300. Too high the input revolution number of automatic transmission mechanism 300 poses a problem associated with heat resistance of input clutch (C1) 310. When the input revolution number of automatic transmission mechanism 300 is sufficiently low, even if the engagement pressure of input clutch (C1) 310 is increased gradually, the heat absorption amount of the engagement element (corresponding to the area) does not exceed the heat absorption capacity thereof. Thus, degradation of input clutch (C1) 310 due to the thermal factors is prevented.

As described above, according to the ECT_ECU as the control device of the present embodiment, when the shift operation from the neutral (N) position to the forward drive (D) position is performed, the engagement start timing of the input clutch C1 that is changed from the disengaged state to the engaged state at the forward drive (D) position is delayed until the turbine revolution number decreases sufficiently. The fuel cut of the engine is performed to decrease the engine revolution number and hence the turbine revolution number. When the turbine revolution number is sufficiently decreased, the engagement oil pressure of input clutch C1 is gradually increased by direct pressure control to make input clutch C1 engaged. As such, the actual heat absorption amount is smaller than the heat absorption capacity of input clutch C1, causing no problem associated with heat resistance of input clutch C1. A shift shock is prevented as well, since the input clutch C1 is engaged only after the turbine revolution number is decreased by lowering the engine revolution number by the fuel cut or the like.

Although the number of revolutions of the turbine has been detected to perform the engagement control of input clutch (C1) 310 based thereon in the above embodiment, the present invention is not limited thereto. For example, instead of delaying the engagement control of input clutch (C1) 310 based on the turbine revolution number NT, the engagement control of input clutch C1 may be started a predetermined period of time after execution of fuel cut of the engine in response to the shift operation from the neutral (N) position to the forward drive (D) position having been done.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A shift control device of an automatic transmission transmitting power from an engine said automatic transmission including a friction engagement element that is engaged in a drive position and disengaged in a non-drive position, an engagement pressure of said friction engagement element being controllable by direct pressure, comprising:
    detection means for detecting a shift from said non-drive position to said drive position;
    output means for outputting a command to execute an output lowering process of said engine to an engine control device in response to detection of the shift to said drive position;
    detection means for detecting an input revolution number to said automatic transmission; and
    control means for starting engagement of said friction engagement element by direct pressure control in response to detection of said input revolution number having been decreased to a predetermined revolution number by said output lowering process.

2. The shift control device of an automatic transmission according to claim 1, further comprising means for controlling the engagement pressure using the direct pressure control to suppress transmission of the power by said friction engagement element in response to detection of the shift to said drive position.

3. The shift control device of an automatic transmission according to claim 2, wherein said drive position is a forward drive position, said non-drive position is a neutral position, and said friction engagement element is an input clutch.

4. The shift control device of an automatic transmission according to claim 1, wherein said predetermined revolution number is set based on a heat absorption amount of said friction engagement element at the time of engagement.

5. The shift control device of an automatic transmission according to claim 1, wherein said drive position is a forward drive position, said non-drive position is a neutral position, and said friction engagement element is an input clutch.

6. A shift control device of an automatic transmission transmitting power from an engine, said automatic transmission including a friction engagement element that is engaged in a drive position and disengaged in a non-drive position, an engagement pressure of said friction engagement element being controllable by direct pressure, comprising:
    detection means for detecting a shift from said non-drive position to said drive position;

output means for outputting a command to execute an output lowering process of said engine to an engine control device in response to detection of the shift to said drive position; and control means for starting engagement of said friction engagement element by direct pressure control after a lapse of a predetermined period of time following initiation of said output lowering process.

7. The shift control device of an automatic transmission according to claim 6, further comprising means for controlling the engagement pressure using the direct pressure control to suppress transmission of the power by said friction engagement element in response to detection of the shift to said drive position.

8. The shift control device of an automatic transmission according to claim 7, wherein said drive position is a forward drive position, said non-drive position is a neutral position, and said friction engagement element is an input clutch.

9. The shift control device of an automatic transmission according to claim 6, wherein said predetermined period of time is set based on a time when a revolution number to said automatic transmission becomes a revolution number that is set in accordance with a heat absorption amount of said friction engagement element at the time of engagement.

10. The shift control device of an automatic transmission according to claim 9, wherein said drive position is a forward drive position, said non-drive position is a neutral position, and said friction engagement element is an input clutch.

11. A shift control device of an automatic transmission transmitting power from an engine, said automatic transmission including a friction engagement element that is engaged in a drive position and disengaged in a non-drive position, an engagement pressure of said friction engagement element being controllable by direct pressure, comprising:

a detection unit detecting a shift from said non-drive position to said drive position;

an output unit outputting a command to execute an output lowering process of said engine to an engine control device in response to detection of the shift to said drive position;

a detection unit detecting an input revolution number to said automatic transmission; and a control circuit starting engagement of said friction engagement element by direct pressure control in response to detection of said input revolution number having been decreased to a predetermined revolution number by said output lowering process.

12. The shift control device of an automatic transmission according to claim 11, further comprising a circuit controlling the engagement pressure using the direct pressure control to suppress transmission of the power by said friction engagement element in response to detection of the shift to said drive position.

13. The shift control device of an automatic transmission according to claim 12, wherein said drive position is a forward drive position, said non-drive position is a neutral position, and said friction engagement element is an input clutch.

14. The shift control device of an automatic transmission according to claim 11, wherein said predetermined revolution number is set based on a heat absorption amount of said friction engagement clement at the time of engagement.

15. The shift control device of an automatic transmission according to claim 14, wherein said drive position is a forward drive position, said non-drive position is a neutral position, and said friction engagement element is an input clutch.

16. The shift control device of an automatic transmission according to claim 11, wherein said drive position is a forward drive position, said non-drive position is a neutral position, and said friction engagement element is an input clutch.

17. A shift control device of an automatic transmission transmitting power from an engine, said automatic transmission including a friction engagement element that is engaged in a drive position and disengaged in a non-drive position, an engagement pressure of said friction engagement element being controllable by direct pressure, comprising:

a detection unit detecting a shift from said non-drive position to said drive position;

an output unit outputting a command to execute an output lowering process of said engine to an engine control device in response to detection of the shift to said drive position; and a control circuit starting engagement of said friction engagement element by direct pressure control after a lapse of a predetermined period of time following initiation of said output lowering process.

18. The shift control device of an automatic transmission according to claim 17, further comprising a circuit controlling the engagement pressure using the direct pressure control to suppress transmission of the power by said friction engagement element in response to detection of the shift to said drive position.

19. The shift control device of an automatic transmission according to claim 17, wherein said predetermined period of time is set based on a time when a revolution number to said automatic transmission becomes a revolution number that is set in accordance with a heat absorption amount of said friction engagement element at the time of engagement.

20. The shift control device of an automatic transmission according to claim 19, wherein said drive position is a forward drive position, said non-drive position is a neutral position, and said friction engagement element is an input clutch.

* * * * *